United States Patent
Mascianica et al.

(10) Patent No.: US 9,982,953 B2
(45) Date of Patent: May 29, 2018

(54) ELECTRIC VEHICLE BATTERY PACK SPACER (71) Applicant: FORD GLOBAL TECHNOLOGIES, LLC, Dearborn, MI (US)

(72) Inventors: Evan Mascianica, Dearborn, MI (US); Saravanan Paramasivam, South Lyon, MI (US); LeeAnn Wang, Canton, MI (US); Kimberley King, Northville, MI (US); Daniel Miller, Dearborn, MI (US); James Lawrence Swoish, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1008 days.

(21) Appl. No.: 14/171,889

(22) Filed: Feb. 4, 2014

(65) Prior Publication Data
US 2015/0219408 A1    Aug. 6, 2015

(51) Int. Cl.
| | |
|---|---|
| *H01M 10/6555* | (2014.01) |
| *H01M 2/14* | (2006.01) |
| *F28F 13/00* | (2006.01) |
| *F28F 13/12* | (2006.01) |
| *H01M 10/6557* | (2014.01) |
| *H01M 10/6566* | (2014.01) |
| *F28F 13/06* | (2006.01) |
| *F28F 3/04* | (2006.01) |

(52) U.S. Cl.
CPC .............. *F28F 13/00* (2013.01); *F28F 13/06* (2013.01); *F28F 13/12* (2013.01); *H01M 2/14* (2013.01); *H01M 10/6557* (2015.04); *H01M 10/6566* (2015.04); *F28F 3/048* (2013.01); *F28F 2240/00* (2013.01); *H01M 2220/20* (2013.01)

(58) Field of Classification Search
CPC .... H01M 10/60–10/627; H01M 10/64; H01M 10/647; H01M 10/656–10/6566
See application file for complete search history.

(56) References Cited

U.S. PATENT DOCUMENTS

| | | | | |
|---|---|---|---|---|
| 5,432,026 A | * | 7/1995 | Sahm ................ | B60H 1/00278 429/120 |
| 5,589,290 A | | 12/1996 | Klink et al. | |
| 5,888,664 A | * | 3/1999 | Sieminski ............ | G06F 1/1632 429/407 |
| 6,290,266 B1 | * | 9/2001 | Kawano .................... | F15D 1/04 138/39 |

(Continued)

FOREIGN PATENT DOCUMENTS

| | | | | |
|---|---|---|---|---|
| JP | 2008269985 A | * | 11/2008 | ............ H01M 10/50 |
| JP | 2009224226 A | * | 10/2009 | ............ H01M 10/50 |

(Continued)

OTHER PUBLICATIONS

Machine translation of JP 2008-269985 (Nov. 2008).*
Machine translation of JP 2009-224226 (Oct. 2009).*
Machine translation of WO 2015-155918 (Oct. 2015).*

*Primary Examiner* — Jonathan Crepeau
*Assistant Examiner* — Jacob Buchanan
(74) *Attorney, Agent, or Firm* — Carlson, Gaskey & Olds, P.C.

(57) ABSTRACT

An example battery pack spacer includes a base and at least one rib extending laterally from the base. The rib is configured to turn flow of a coolant through a battery pack.

18 Claims, 5 Drawing Sheets

(56) References Cited

U.S. PATENT DOCUMENTS

| | | |
|---|---|---|
| 7,560,190 B2 | 7/2009 | Ahn et al. |
| 8,268,472 B2 | 9/2012 | Ronning et al. |
| 8,507,122 B2 | 8/2013 | Saito et al. |
| 2006/0214641 A1* | 9/2006 | Cho .................. H01M 10/4207 320/150 |
| 2007/0026300 A1* | 2/2007 | Lee .................... H01M 2/1061 429/120 |
| 2007/0026303 A1* | 2/2007 | Jeon .................... H01M 2/1077 429/143 |
| 2011/0244293 A1 | 10/2011 | Khalighi et al. |
| 2011/0244295 A1 | 10/2011 | Han et al. |

FOREIGN PATENT DOCUMENTS

| | | | | |
|---|---|---|---|---|
| WO | WO 2014087234 A1 * | 6/2014 | .......... | H01M 2/1276 |
| WO | WO 2015155918 A1 * | 10/2015 | .......... | H01M 10/647 |

* cited by examiner

ELECTRIC VEHICLE BATTERY PACK SPACER

BACKGROUND

This disclosure relates generally to a cooled electric vehicle battery and, more particularly, to turning a flow of coolant moving through the battery pack using a spacer.

Generally, electric vehicles differ from conventional motor vehicles because electric vehicles are selectively driven using one or more battery-powered electric machines. Conventional motor vehicles, by contrast, rely exclusively on an internal combustion engine to drive the vehicle. Electric vehicles may use electric machines instead of, or in addition to, the internal combustion engine.

Example electric vehicles include hybrid electric vehicles (HEVs), plug-in hybrid electric vehicles (PHEVs), fuel cell vehicles, and battery electric vehicles (BEVs). A powertrain of an electric vehicle is typically equipped with a battery that stores electrical power for powering the electric machine. The battery may be charged prior to use. The battery may be recharged during a drive by regeneration braking or an internal combustion engine.

Figure 1:
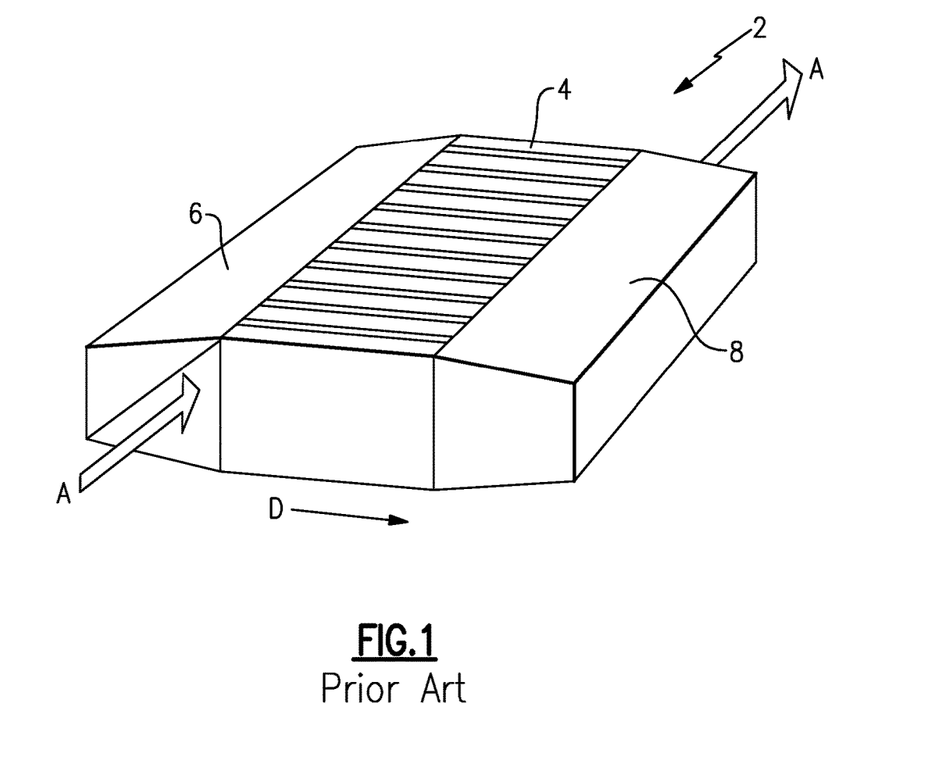
FIG. 1 illustrates an example prior art battery pack.

Referring to FIG. 1, a prior art battery pack 2 include arrays of battery cells 4. The prior art battery pack 2 is cooled with a coolant, such as air. Typically, the air enters the battery pack 2 through an inlet plenum 6 on one side of the battery cells 4. The air then travels between the battery cells 4 in a single direction D and moves into an outlet plenum 8. The inlet plenum 6 and the outlet plenum 8 are on opposing lateral sides of the battery cells 4. Packaging the prior art battery pack 2 is often difficult.

SUMMARY

A battery pack spacer according to an exemplary aspect of the present disclosure includes, among other things, a base, and at least one rib extending laterally from the base. The rib configured to turn flow of a coolant through a battery pack.

In another example of the foregoing battery pack spacer, the at least one rib includes at least one first rib extending laterally from the base in a first direction and at least one second rib extending laterally from the base in a second direction opposite the first direction.

In another example of any of the foregoing battery pack spacers, the at least one rib receives the flow from an inlet side of the battery pack and turns the flow to exit the battery pack at an outlet side. The inlet side is transverse to the outlet side.

In another example of any of the foregoing battery pack spacers, the inlet side is perpendicular to the outlet side.

In another example of any of the foregoing battery pack spacers, the at least one rib extends from the inlet side to the outlet side.

In another example of any of the foregoing battery pack spacers, the inlet side is at a vertical bottom of the battery pack.

In another example of any of the foregoing battery pack spacers, the rib is positioned between a battery cell and the base within a battery pack.

In another example of any of the foregoing battery pack spacers, the rib directly contacts the battery cell.

In another example of any of the foregoing battery pack spacers, the base and the battery cell provide opposing sides of a channel for communicating the flow through the battery pack, and the at least one rib provides another side of the channel.

In another example of any of the foregoing battery pack spacers, the coolant is air.

In another example of any of the foregoing battery pack spacers, the spacer includes blocks extending from the base. The blocks turbulate the flow of the coolant.

In another example of any of the foregoing battery pack spacers, the blocks define slits to permit some flow of the coolant through the blocks.

A method of cooling a battery pack according to another exemplary aspect of the present disclosure includes receiving a flow of coolant through a vertical bottom of a battery pack. The flow is received between adjacent battery cells of the battery pack. The method includes turning the flow to exit through a side of the battery pack.

In another example of the foregoing method, the method includes turning the flow using at least one rib extending laterally from a spacer.

In another example of any of the foregoing methods, the method includes compressing the at least one rib against at least one of the battery cells.

In another example of any of the foregoing methods, the method includes the flow moving through the battery pack within channels provided on one side by a battery cell, on an opposing side by a base, and on another side by the at least one rib.

In another example of any of the foregoing methods, the method includes turbulating the flow moving through the channels using a block extending from the at least one rib.

In another example of any of the foregoing methods, the method includes communicating some of the flow through a slit in the block.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 2:
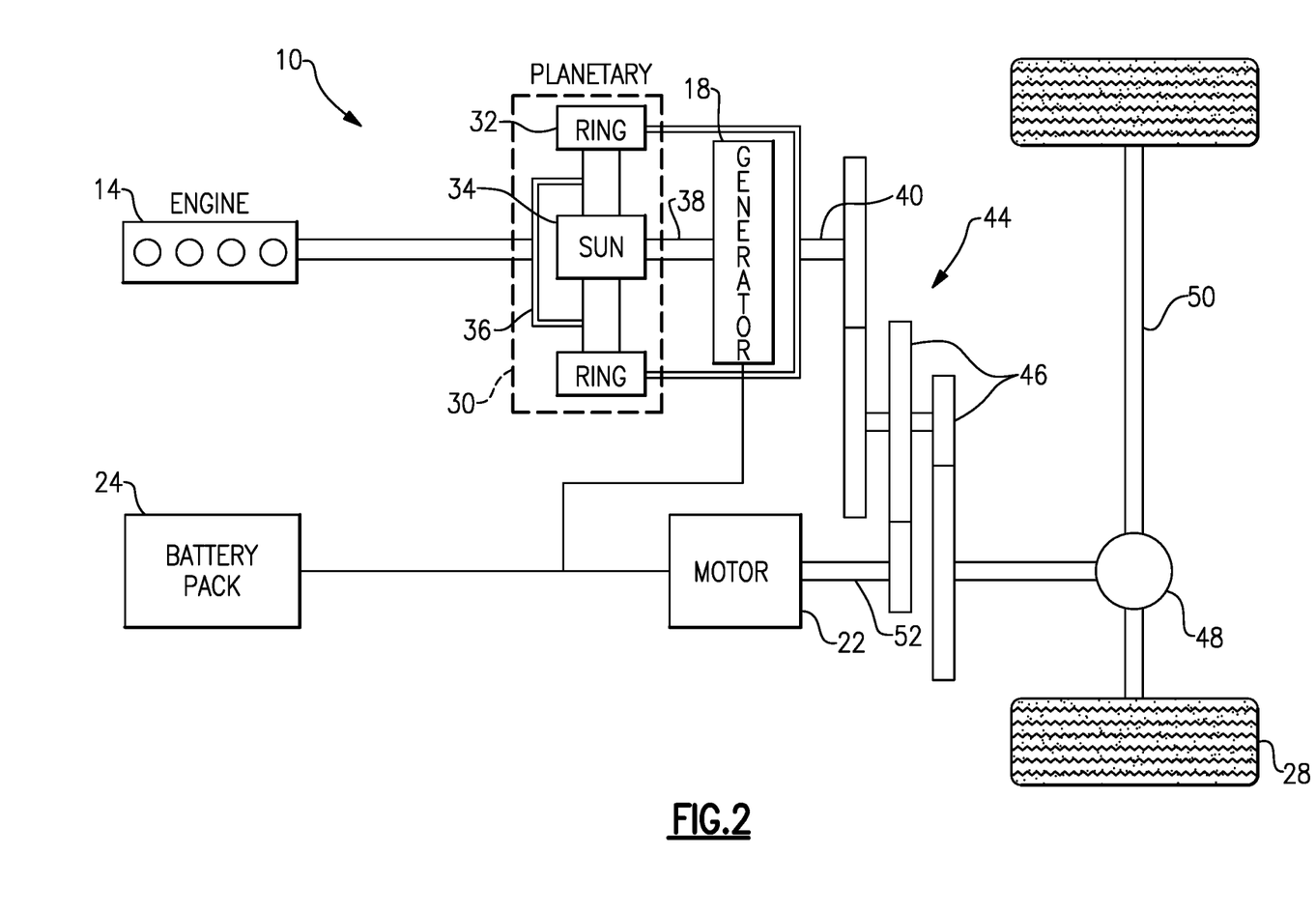
FIG. 2 illustrates a schematic view of a powertrain of an electric vehicle including a battery pack of the present disclosure.

FIG. 2 schematically illustrates a powertrain 10 for an electric vehicle. Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electric vehicle.

The engine 14, which is an internal combustion engine in this example, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electric vehicle battery assembly. The battery pack 24 may have the form of a high voltage battery that is capable of outputting electrical power to operate the motor 22 and the generator 18. Other types of energy storage devices and/or output devices can also be used with the electric vehicle having the powertrain 10.

Figure 3:
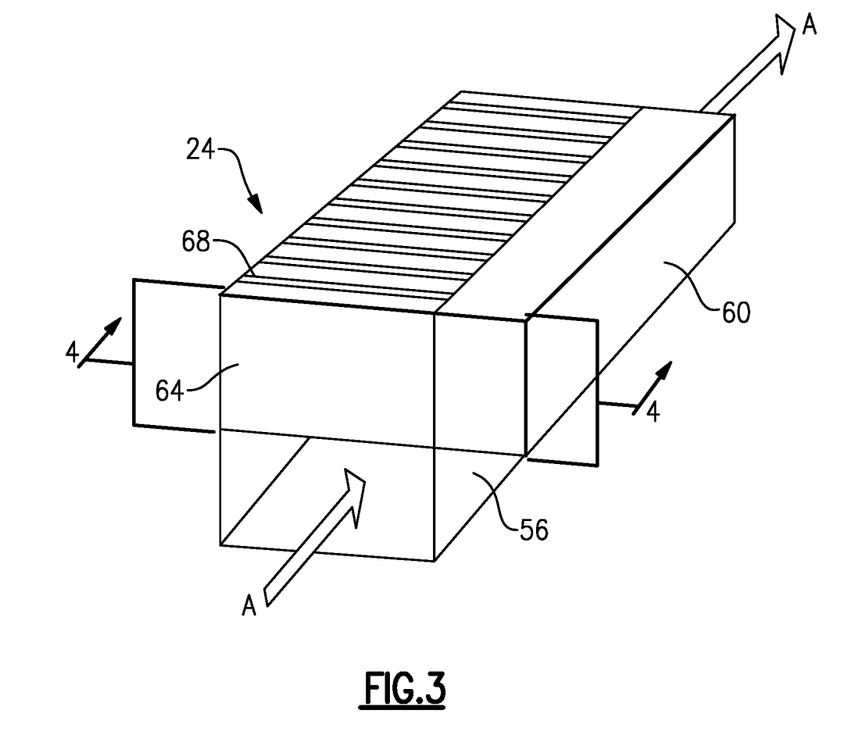
FIG. 3 illustrates a perspective view of the battery pack of FIG. 2.
Figure 4:
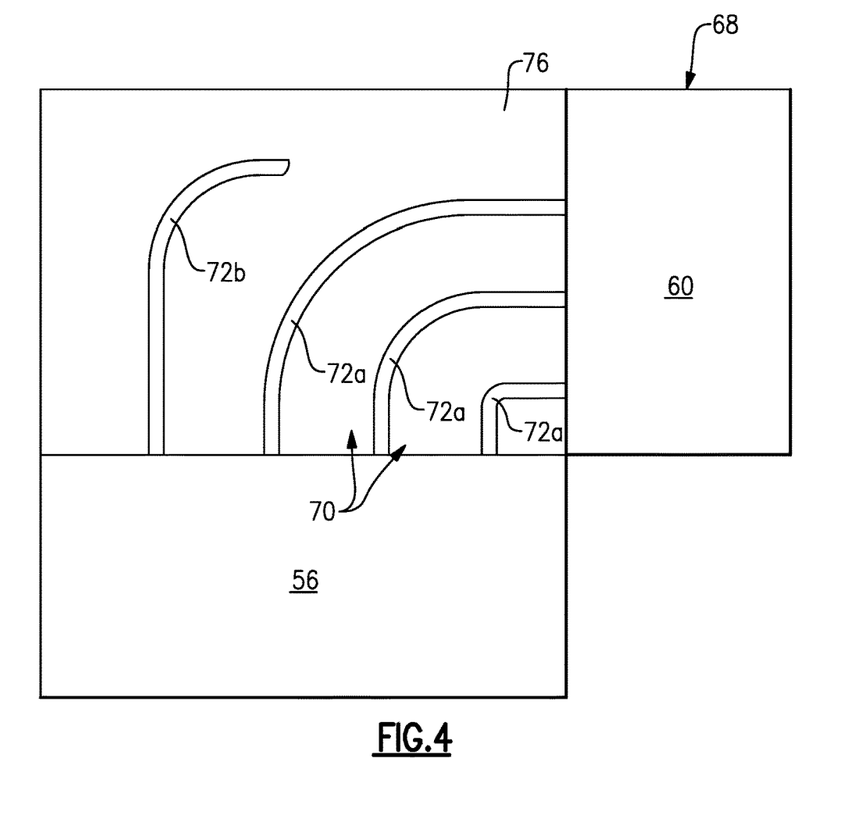
FIG. 4 illustrates a section view at line 4-4 in FIG. 3 showing an example spacer used to turn a flow of coolant.
Figure 5:
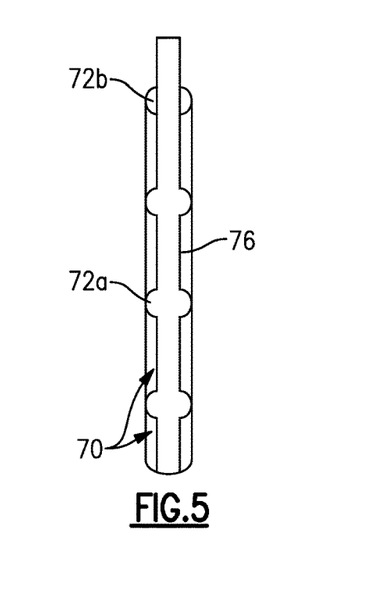
FIG. 5 illustrates a side view of the spacer from a direction of an outlet plenum.

Referring now to FIGS. 3 to 5, the example battery pack 24 is cooled with a fluid coolant, such as air. The battery pack 24 includes an inlet plenum 56, an outlet plenum 60, a plurality of battery cells 64, and a plurality of spacers 68. The example spacers 68 are positioned between one or more of the battery cells 64 to provide an array of battery cells 64.

To cool the example battery pack 24, air enters the inlet plenum 56, flows between the battery cells 64, and into the outlet plenum 60. The air carries thermal energy generated by the battery cells 64 away from the battery pack 24.

In this example, the inlet plenum 56 is located at a vertical bottom of the battery cell 64 and spacers 68. Vertical is with reference to the horizon or ground and the typically orientation of the battery cells 64 during normal operation.

The outlet plenum 60, in contrast to the inlet plenum 56, is located at a lateral side of the battery pack 24. Such placement of the inlet plenum 56 facilitates reducing the lateral width of the battery pack 24, which may be desirable in some packaging situations.

The air moving between the battery cells 64 is guided within channels 70. The spacers 68 and the battery cells 64 provide the channels 70. The example spacers 68 turn the air, which provides for flexible positioning of the inlet plenum 56 and the outlet plenum 60.

To turn the air, the example spacers 68 include a plurality of vanes 72 extending outward from opposing sides of a planar base 76. At least some of the vanes 72 extend along a curved path, which causes the air flowing from the inlet plenum 56 to turn into the outlet plenum 60.

In this example, the planar base 76 provides one side of the channel 70, the battery cells 64 provide an opposing side, and the vanes 72 provide another of the sides. The channel 70 may include three sides or some other number of sides.

The vanes 72 can extend from the inlet plenum 56 to the outlet plenum 60, such as the vanes 72a, other vanes, such as the vane 72b may extend partially toward the outlet plenum 60, but them terminate prior to reaching the outlet plenum 60.

In still other examples, the vanes 72 may begin at a position spaced from the inlet plenum 56 and extend all the way to the outlet plenum 60.

Within the battery pack 24, the vanes 72 contact the battery cell 64. The contact spaces the planar portion 76 of the spacer 68 from the battery cell 64.

Figure 6:
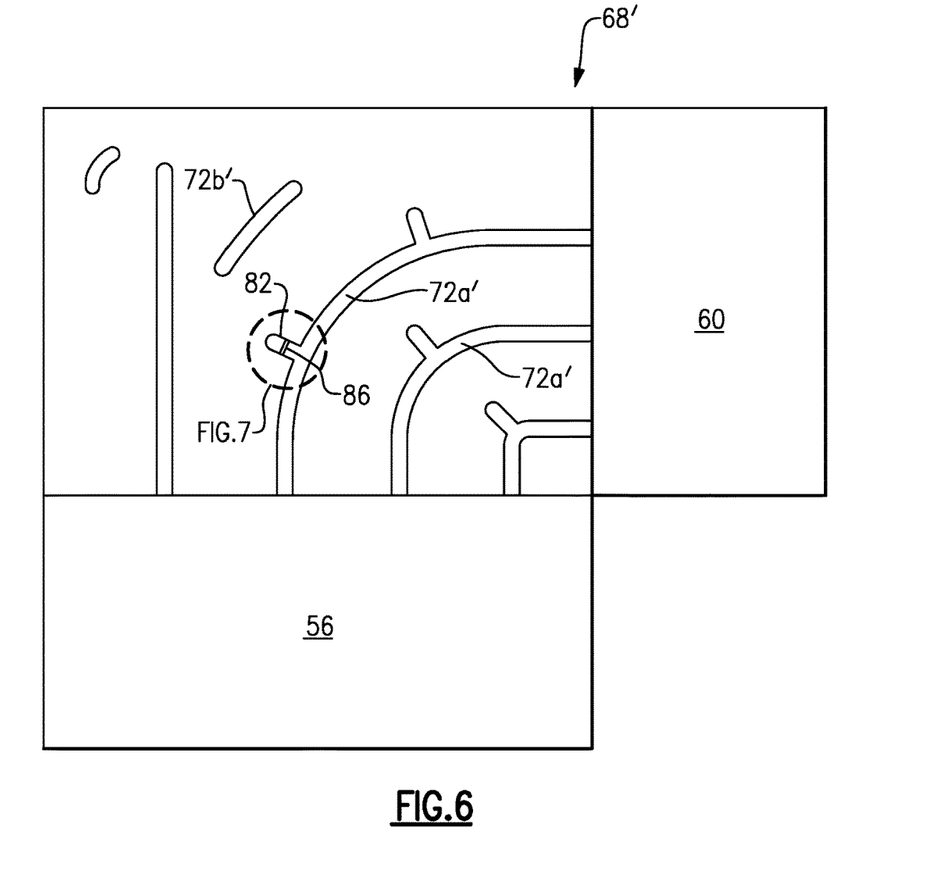
FIG. 6 illustrates a section view at line 4-4 in FIG. 3 showing another example spacer.

Referring now to FIG. 6, in another example, blocks 82 may extend from vanes 72a'. The blocks 82 turbulate flow moving through the channels. Partial vanes 72b' may be positioned elsewhere within the spacer 68' depending on desired flow paths for the air delivered from the inlet 56.

Figure 7:
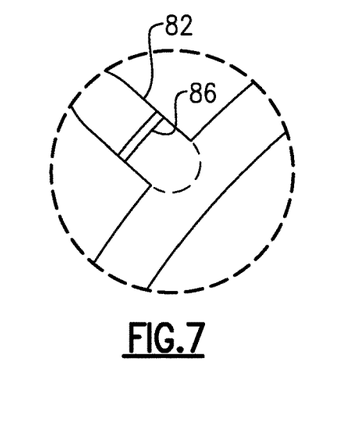
FIG. 7 illustrate a close up view of area 7 in FIG. 6.

In some examples, voids V exist behind the blocks 82. The blocks 82 may thus include slits 86 delivering air to the void areas V through the blocks 82.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A battery pack spacer, comprising:
   a base having an inlet side and an outlet side transverse to the inlet side;
   at least one rib extending away from the base, the at least one rib configured to turn a flow of a coolant through a battery pack such that all of the flow received from an inlet manifold adjacent the inlet side flows to an outlet manifold adjacent the outlet side, the inlet manifold spanning across the inlet side from the outlet side to an opposing side opposite the outlet side; and
   blocks extending from the base, the blocks are configured to turbulate the flow of the coolant, wherein the blocks define slits to permit some flow of the coolant through the blocks.

2. The spacer of claim 1, wherein the at least one rib includes at least one first rib extending outward from the base in a first direction and at least one second rib extending outward from the base in a second direction opposite the first direction.

3. The spacer of claim 1, wherein the inlet side is perpendicular to the outlet side.

4. The spacer of claim 1, wherein the at least one rib extends from the inlet side to the outlet side.

5. The spacer of claim 1, wherein the inlet side is at a vertical bottom of the battery pack.

6. The spacer of claim 1, wherein the at least one rib is positioned between a battery cell and the base within a battery pack.

7. The spacer of claim 6, wherein the base and the battery cell provide opposing sides of a channel for communicating the flow through the battery pack, and the at least one rib provides another side of the channel.

8. The spacer of claim 7, further comprising at least one block configured to turbulate the flow of coolant, the at least one block extending from the at least one rib and the base, the at least one block having a slit configured to permit some flow of the coolant through the at least one block, the slit extending linearly along a slit axis from a first side of the at least one block to an opposing, second side of the at least one block, the slit axis aligned with a general direction of flow through the channel from the inlet manifold to the outlet manifold.

9. The spacer of claim 1, wherein the battery pack spacer is separate from the inlet manifold and separate from the outlet manifold such that the battery pack spacer provides no portion of the inlet manifold or the outlet manifold, wherein the battery pack spacer is disposed outside the inlet manifold and the outlet manifold such that no portion of the battery pack spacer extends into the inlet manifold or the outlet manifold.

10. A method of cooling a battery pack, comprising:
receiving a flow of coolant from an inlet manifold at a vertical bottom of a battery pack, the flow received between adjacent battery cells of the battery pack; and
turning all the flow to exit through a first side of the battery pack into an outlet manifold, the inlet manifold spanning across the vertical bottom from the first side to an opposing second side.

11. The method of claim 10, further comprising turning the flow using at least one rib extending outward from a base of a spacer.

12. The method of claim 11, further comprising compressing the at least one rib against at least one of the battery cells.

13. The method of claim 11, wherein the flow moves through the battery pack within channels provided on one side by a battery cell, on an opposing side by a base, and on another side by the at least one rib.

14. The method of claim 13, further comprising turbulating the flow moving through the channels using a block extending from the at least one rib.

15. The method of claim 14, further comprising communicating some of the flow through a slit in the block.

16. The method of claim 14, further comprising turning some of the flow using at least one first rib on a first side the base of the spacer and turning some of the flow using at least one second rib on an opposing second side of the base.

17. The method of claim 11, wherein the spacer is separate from the inlet manifold and separate from the outlet manifold such that the spacer provides no portion of the inlet manifold or the outlet manifold, wherein the spacer is disposed outside the inlet manifold and the outlet manifold such that no portion of the spacer extends into the inlet manifold or the outlet manifold.

18. A battery pack spacer, comprising:
a base having an inlet side and an outlet side transverse to the inlet side;
at least one rib extending away from the base, the at least one rib configured to turn a flow of a coolant through a battery pack such that all of the flow received from an inlet manifold adjacent the inlet side flows to an outlet manifold adjacent the outlet side, the inlet manifold spanning across the inlet side from the outlet side to an opposing side opposite the outlet side; and
at least one block configured to turbulate the flow of coolant, the at least one block extending from the at least one rib transverse to a general direction of flow through the channel from the inlet manifold to the outlet manifold,
wherein the at least one rib is positioned between a battery cell and the base within a battery pack,
wherein the base and the battery cell provide opposing sides of a channel for communicating the flow through the battery pack, and the at least one rib provides another side of the channel.

* * * * *

UNITED STATES PATENT AND TRADEMARK OFFICE
CERTIFICATE OF CORRECTION

PATENT NO.       : 9,982,953 B2
APPLICATION NO.  : 14/171889
DATED            : May 29, 2018
INVENTOR(S)      : Evan Mascianica et al.

Page 1 of 1

It is certified that error appears in the above-identified patent and that said Letters Patent is hereby corrected as shown below:

In the Claims

In Claim 16, Column 6, Line 10; before "further comprising turning" replace "claim 14," with --claim 11,--

Signed and Sealed this
Fourth Day of September, 2018

Andrei Iancu
*Director of the United States Patent and Trademark Office*